United States Patent
Kornfeldt et al.

[11] Patent Number: 5,464,258
[45] Date of Patent: Nov. 7, 1995

[54] COMPRESSION JOINT

[75] Inventors: Hans Kornfeldt; Lars-Åke Körnvik; Lars Törnblom, all of Västerås, Sweden

[73] Assignee: ABB Atom AB, Vasteras, Sweden

[21] Appl. No.: 351,360

[22] PCT Filed: Jun. 4, 1993

[86] PCT No.: PCT/SE93/00495

§ 371 Date: Dec. 8, 1994

§ 102(e) Date: Dec. 8, 1994

[87] PCT Pub. No.: WO94/00711

PCT Pub. Date: Jan. 6, 1994

[30] Foreign Application Priority Data

Jun. 23, 1992 [SE] Sweden .................. 9201922

[51] Int. Cl.⁶ .................. F16L 47/00; F16L 25/06
[52] U.S. Cl. .................. 285/293; 285/381; 285/417
[58] Field of Search .................. 285/381, 292, 285/293, 417, 419, 37, 373

[56] References Cited

U.S. PATENT DOCUMENTS

| | | | |
|---|---|---|---|
| 4,296,955 | 10/1981 | Martin | 285/417 X |
| 4,310,183 | 1/1982 | Szalvay | 285/381 X |
| 4,424,411 | 1/1984 | Clabburn | 285/381 X |
| 4,709,948 | 12/1987 | Archer et al. | 285/381 |
| 4,836,586 | 6/1989 | Martin | 285/417 X |
| 5,169,176 | 12/1992 | Brossard | 285/381 X |
| 5,338,070 | 8/1994 | Horikawa et al. | 285/381 X |

Primary Examiner—Randolph A. Reese
Assistant Examiner—Heather Chun Shackelford
Attorney, Agent, or Firm—Watson, Cole, Grindle & Watson

[57] ABSTRACT

The invention relates to a compression joint for reinforcement and support over bent tubular components. According to the invention, a first sleeve (5) is applied around the bent tubular component, the inner surface (10) of the first sleeve being formed to fit closely around the tube at the point of reinforcement. This sleeve (5) is divided into at least two parts along axial sections and has an outer, substantially rotationally symmetrical surface (11). Around this sleeve (5), a second sleeve (9) with an inner rotationally symmetrical surface is arranged. The outer surface of this second sleeve (9) is adapted to receive a winding (14, 15) comprising several layers of strip or wire of memory metal. Before being wound around the second sleeve (9) at a temperature below the transition temperature of the memory metal, the strip or wire has been stretched to a suitable length to bring about a desired compressive stress in the joint after being wound on and a subsequent increase of the temperature of the winding (14, 15) above the transition temperature.

4 Claims, 2 Drawing Sheets

COMPRESSION JOINT

BACKGROUND OF THE INVENTION

Testing of welded joints in, for example, pressure vessels or tubes often leads to different types of fault indications in the weld or in material adjoining the weld. This has become accentuated by the introduction, especially in nuclear power plants, of new testing technique and new testing criteria. It is known in, for example, straight rotationally symmetrical tubes to place a compression joint over the welded joint to reinforce this and prevent crack growth in the region around the weld. For this purpose, compression joints consisting of a winding in several layers of strip or wire have been used. The strip or wire has been of memory metal. Prior to being wound on, with no significant tensile stress in the wire around the tube, at a temperature below the transition temperature of the memory metal, the wire has been stretched to a suitable length to achieve the desired compressive stress in the joint after the winding around the tube and a subsequent increase of the temperature above the transition temperature.

If the joint weld is arranged between a straight and a bent tube or between two bent tubes, however, difficulties arise in winding on a strip or a wire around the joint since the bent tube does not form a rotationally symmetrical base for the winding operation.

SUMMARY OF THE INVENTION

The present invention relates to an invention which eliminates the above-mentioned difficulties. According to the invention, the compression joint comprises a first sleeve whose inner surface is formed to fit closely around the tube over the point which is to be reinforced, for example a welded joint. The sleeve is divided into at least two parts along axial sections. The first sleeve is formed with an outer, substantially rotationally symmetrical surface. A second sleeve with a corresponding inner rotationally symmetrical surface is divided into at least two parts along axial sections and intended to be rotatably arranged around the first sleeve after the first sleeve has been placed around the reinforcement point. The outer surface of the second sleeve is designed to receive a winding comprising several layers of strip or wire of memory metal. Prior to being wound around the second sleeve at a temperature below the transition temperature of the memory metal, this strip or wire has been stretched to a suitable length to bring about the desired compressive stress in the joint after the winding around the second sleeve and a subsequent increase of the temperature of the winding above the transition temperature.

Since the first sleeve has an external shape which is substantially rotationally symmetrical, the second sleeve can be given a corresponding rotationally symmetrical shape. This second sleeve can be caused to rotate around the first sleeve, whereby the strip or wire of memory metal is wound onto the second sleeve.

In order for the first sleeve to be placed around the bend, the sleeve has to be divided into at least two parts—preferably more than two—by means of axial sections. In that case, when the sleeve parts are applied around the bend, a certain minimum gap should be provided between the sleeve parts such that these can be pressed hard against the tube, by the second sleeve and the winding, when the temperature is raised above the transition temperature of the winding. Also the second sleeve must be divided into at least two parts to be able to be applied around the first sleeve. Also between these sleeve parts there should be a certain gap when they are mounted around the first sleeve.

BRIEF DESCRIPTION OF THE DRAWINGS

The invention will be most readily understood with reference to FIGS. 1 and 2.

DETAILED DESCRIPTION OF THE INVENTION

Figure 1:
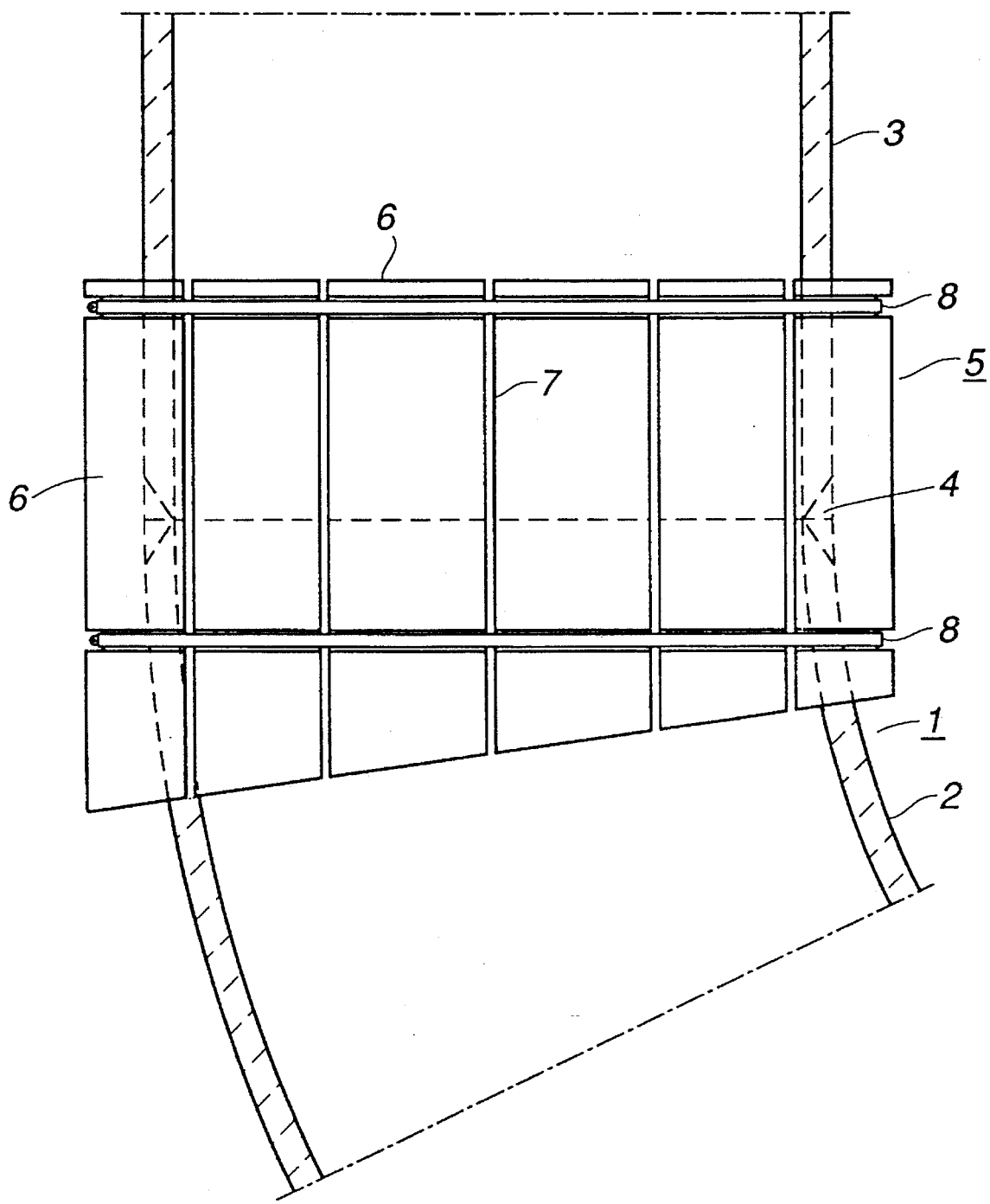
FIG. 1 shows the first sleeve applied to the bend and FIG. 2 a section through a compression joint with the second sleeve mounted around the first sleeve.

In FIG. 1, 1 designates the tube bend, which in this case consists of a bent tube part 2 and a straight tube part 3 which are joined by means of a joint 4. Around this joint, cracks in the tube may arise. Around the tube, at this joint 4, the first sleeve 5 has been placed. It is divided by means of axial sections into several sleeve parts 6. The sleeve parts 6 are arranged with gaps 7 between them in order for the force from the second sleeve (not shown) and the winding to be transmitted to the bend 1. The sleeve parts 6 are kept in position around the tube by straps 8.

Figure 2:
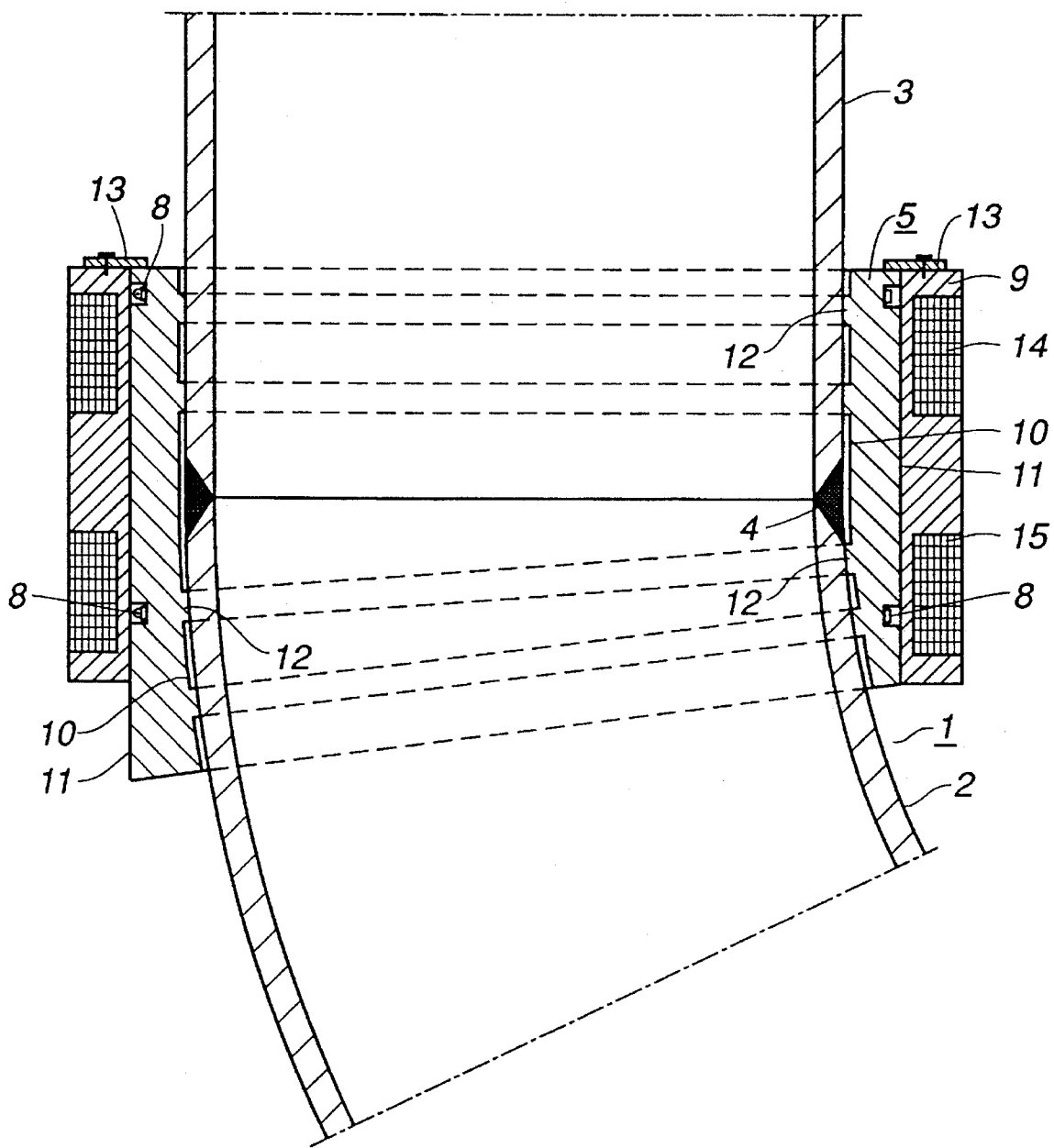

In FIG. 2 the second sleeve 9 is shown mounted rotatably about the first sleeve 5. FIG. 2 shows how the inner surface 10 of the first sleeve 5 has been formed to fit closely around the bend 1. The outer surface 11 of the first sleeve 5, on the other hand, is substantially rotationally symmetrically formed, e.g., arcuate. In the embodiment shown it is assumed that the outer surface 11 has the shape of a straight, almost circular cylinder (a slightly oval shape may occur). Further, the first sleeve 5 is provided towards the bend 1 with grooves or ridges 12 on both sides of the welded joint 4. These ridges are intended to increase the pressure of the compression joint against the tube and to strengthen the axial holding force of the joint.

Also the second sleeve 9 has a corresponding inner, substantially rotationally symmetrically formed surface, and is divided into at least two parts along axial sections, while the strip or wire is being wound on, the sleeve parts are retained by a ring 13, which can also guide the sleeve 9 towards the sleeve 5. In the embodiment shown, the second sleeve 9 is designed to receive two separate windings 14 and 15, but it is self-evident that only one winding along the whole sleeve 9 can be used. In that case, the winding can probably be made somewhat more centralized along sleeve 9. When winding on the strip or wire of memory metal around the sleeve 9, this sleeve is rotated with the aid of suitable equipment (not shown). The winding on takes place at a temperature below the transition temperature of the memory metal, and before being wound on the wire or strip has been stretched to a suitable length in order to bring about a desired compressive stress in the joint when the temperature in the joint after the winding is raised above the transition temperature.

When the transition temperature is exceeded, the wire or strip contracts and presses the parts of the second sleeve 9 (which parts, like the parts of the first sleeve 5, are arranged in spaced relationship) against the inner first sleeve 5, the sleeve parts of which in their turn are pressed against the bend 1. By the invention, a simple and efficient reinforcement of a bend 1 is obtained in this way.

We claim:

1. A compression joint to be located around a bent tube (1), especially over a joint weld (4) around the tube (1) in order to reinforce the tube (1), wherein said compression joint comprises a first sleeve (5), the inner (10) surface of which is formed to fit closely around the tube (1) at the point of reinforcement, said sleeve (5) being divided into at least two parts (6) along the axial direction, said first sleeve (5) having an outer, arcuate surface (11), a second sleeve (9) with a corresponding inner, arcuate surface, said second sleeve (9) being divided into at least two parts along the axial direction and being rotatably arranged about said first sleeve (5), the outer surface of said second sleeve (9) receiving a winding (14, 15) comprising several layers of strip or wire of memory metal, said strip or wire, before being wound about the second sleeve (9) at a temperature below the transition temperature of the memory metal, being stretched to a suitable length to bring about a desired compressive stress in the joint after winding around the second sleeve (9) and a subsequent increase of the temperature of the winding above the transition temperature.

2. A compression joint according to claim 1, wherein said first sleeve (5) is divided into a plurality of sleeve parts (6) by means of axial sections, said sleeve parts (6) being fixed around the reinforcement point by means of straps (8) arranged around the outer surface (11) of the first sleeve (5).

3. A compression joint according to claim 1, wherein the outer surface (11) of the first sleeve (5) is formed as a straight, substantially circular cylinder.

4. A compression joint according to claim 1, wherein the winding is divided into two separate windings (14, 15) arranged on both sides of the joint (4).

* * * * *